CIRCUIT ARRANGEMENT FOR PRODUCING A DEFLECTION CURRENT THROUGH THE HORIZONTAL DEFLECTION COILS OF A TELEVISION APPARATUS

Filed April 2, 1964 2 Sheets-Sheet 1

INVENTOR.
TEUNIS POORTER
BY
Frank R. Jeifari
AGENT

INVENTOR.
TEUNIS POORTER
BY
[signature]
AGENT

United States Patent Office 3,346,764
Patented Oct. 10, 1967

3,346,764

CIRCUIT ARRANGEMENT FOR PRODUCING A DEFLECTION CURRENT THROUGH THE HORIZONTAL DEFLECTION COILS OF A TELEVISION APPARATUS

Teunis Poorter, Emmasingel, Eindhoven, Netherlands, assignor to North American Philips Company, Inc., New York, N.Y., a corporation of Delaware Filed Apr. 2, 1964, Ser. No. 356,767
Claims priority, application Netherlands, Apr. 5, 1963, 291,219
13 Claims. (Cl. 315—27)

The invention relates to a circuit arrangement for producing a deflection current through the horizontal deflection coils of a television apparatus for the deflection of an electron beam in a cathode-ray tube, whilst either the beam scans the screen or the light ray emitted by the tube strikes the face onto which the picture reproduced by the tube has to be projected so that a trapezoidal picture is obtained, the central perpendicular extends in a vertical direction, said device comprising a horizontal final stage, the output circuit of which includes the horizontal output transformer and an efficiency diode, said transformer having coupled with it the deflection coils, there being provided means for the amplitude-modulation of the horizontal deflection current in the rhythm of the frequency of the vertical deflection signal.

The amplitude-modulation of the horizontal deflection current results, it is true, in that the trapezoidal deformation is obviated, but without taking further measures an asymmetry of the picture in a horizontal direction is at the same time produced. In accordance with the idea of the invention this is due to the fact that the circuit formed by the output transformer, the deflection coils and the capacitance of the output circuit determines completely not only the fly-back time of the produced horizontal deflection current, but also, by means of its quality Q, the ratio between the energy accumulated at the beginning and the energy accumulated at the end of a fly-back in the inductance of said circuit. Thus the horizontal deflection current has added to it not only the desired amplitude-modulation but also a shifting component in the rhythm of the frequency of the vertical deflection signal. This latter component cannot be removed by means of separation capacitors or other alternating-current coupling members between the output transformer and the deflection coils, since small separation capacitors would not only remove the undesirable shifting component but also deform the horizontal deflection current.

In order to obviate this disadvantage the circuit arrangement according to the invention is characterized in that in order to avoid asymmetry of the picture in a horizontal direction the arrangement comprises furthermore means for varying the quality Q of the circuit formed by the output transformer, the deflection coils and the capacitance of the output circuit also in the rhythm of the frequency of the vertical deflection signal and in the same sense as the amplitude-modulation of the horizontal deflection current (increasing amplitude of deflection current→increasing quality Q and conversely).

A few possible embodiments of circuit arrangements according to the invention will be described with reference to the accompanying drawing, in which.

In a horizontal deflection circuit including an output tube, an output transformer and an efficiency diode, the current flowing during the fly-back time is determined, as is known, by the equation:

$$i=I_0 e^{-\frac{R}{2L}t}\cos \omega t \qquad (1)$$

wherein $$\omega=\frac{1}{\sqrt{LC}}$$

is the angular frequency of the current flowing during the flyback, $I_0$ is the current flowing through the inductance L of said circuit at the beginning of a fly-back, R is the overall ohmic resistance of said circuit, determined by losses occurring in the output circuit, and C is the capacitance of said circuit.

Assuming that at the instant $t=O$, the fly-back period starts, it can be written for the initial current $i_b$:

$$i_b=I_0 \qquad (2)$$

The fly-back time terminates at the instant $t=\tau=\pi LC$. Introducing this into the Equation 1, we obtain for the current at the end of the fly-back:

$$i_e=-I_0 e^{-\frac{\pi}{2Q}} \qquad (3)$$

when $$Q=\frac{1}{R}\sqrt{\frac{L}{C}}$$

Since the initial value $I_0$ occurs both in the Equation 2 and in the Equation 3, it is found that the ratio between the final current $i_e$ and the initial current $i_b$ is independent of $L_0$, so that:

$$\left|\frac{i_e}{i_b}\right|=e^{-\frac{\pi}{2Q}}$$

By modulation of the deflection current, $I_0$, however, increases constantly and hence also $i_b$ and $i_e$. If the initial values of the currents are designated in order of succession by $i_{b1}$, $i_{b2}$, $i_{b3}$ and so on and the final values of the currents by $i_{e1}$, $i_{e2}$, $i_{e3}$, and so on, it is found that:

$$i_{b1}<i_{b2}<i_{b3} \text{ and so on}$$

and $$i_{e1}<i_{e2}<i_{e3} \text{ and so on}$$

Figure 1:
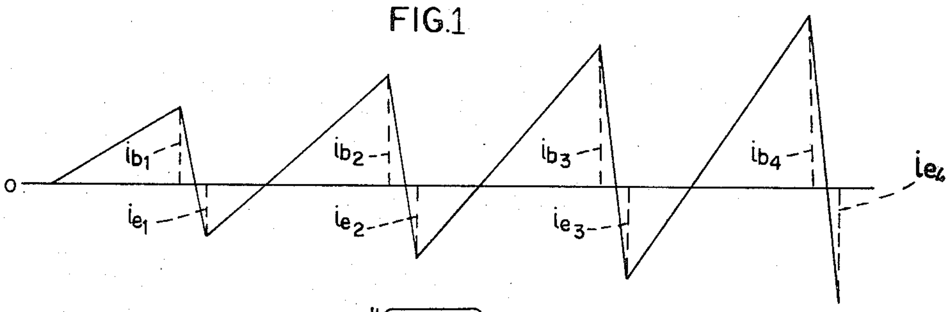
FIG. 1 is a graph of a deflection current in an arrangement comprising an output transformer and an efficiency diode for explaining the phenomenon of asymmetry.

This is plotted in FIG. 1, in which it is assumed for the sake of simplicity that:

$$\left|\frac{i_{e1}}{i_{b1}}\right|=\left|\frac{i_{e2}}{i_{b2}}\right|=\left|\frac{i_{e3}}{i_{b3}}\right|=\ldots=e^{-\frac{\pi}{2Q}}=\frac{2}{3}$$

From this figure it is apparent that for the sawtooth current there occurs a shift with respect to the zero axis, which shift is located above this axis in the example shown in FIG. 1. This can be accounted for by the fact that with respect to the forward stroke period each final value of the current $i_e$ of the preceding fly-back is associated with the initial value of the current $i_b$ of the next-following fly-back. Thus $i_{e1}$ is associated with $i_{b2}$, $i_{e2}$ with $i_{b3}$, and so on. The portion of the sawtooth current above the zero axis thus increases earlier than the portion beneath the zero axis, so that a shift component is included in the signal. In order to obtain satisfactory correction of the trapezoidal deformation, the horizontal deflection current must be modulated in the rhythm of the frequency of the vertical deflection signal, which means that the shift component also varies at the frequency of the vertical deflection signal, so that apart from the desired amplitude-modulation for the correction of the trapozoidal deformation, an undesirable vertical shift component is found in the correct signal.

It will be apparent that, when the modulation of the horizontal deflecting current is performed so that the amplitude must decrease, the shift component would lie beneath the zero axis, since in this case the final value of the current $i_e$ of the preceding fly-back is too high with respect to the initial value of the current $i_b$ of the next-following fly-back.

As a result of this shift component, the reproduced or scanned picture is no longer symmetrical to a central perpendicular, but is shifted to a contantly greater extent as the amplitude of the shift component increases. This means that as the amplitude of the modulated horizontal signal becomes greater or smaller, the asymmetry increases. In order to eliminate this asymmetry from the picture, it is therefore necessary to eliminate the said shift component from the signal.

This undesirable component cannot be removed from the modulated horizontal signal by means of passive circuit elements such as capacitors and transformers, in spite of the fact that a great frequency difference exists between the vertical deflection signal and the horizontal deflection signal, since the horizontal signal itself is then also distorted in an undesirable manner.

In accordance with the theory of the invention, this component can be eliminated by providing that during each fly-back the final value of the current $i_e$ matches the initial value of the current $i_b$ of the next-following fly-back. Consequently, $i_{e1}$ matches $i_{b2}$, $i_{e2}$ matches $i_{b3}$, and so on. This can be achieved by varying the damping of the circuit formed by the output transformer, the deflection coils and the capacitances of the output circuit in the rhythm of the frequency of the vertical deflection signal in a sense opposite the sense of the amplitude-modulation. If the amplitude increases, the damping must decrease, and conversely. In the example given in FIG. 1, the value of the final current $i_e$ will increase when the quality Q of the circuit is raised, which means a diminution of the damping. Since the value of the initial current $i_b$ is fixed by the modulation, $i_e$ is automatically matched when the damping, and hence the quality Q, are varied in a manner matching said modulation.

The embodiments shown in FIGS. 2 to 5 illustrate how this compensation may be carried out in practice.

In principle the amplitude-modulation of the horizontal deflection current can be carried out by two methods:

(a) Variation of the voltage of the booster capacitor, since this voltage determines the slope of the sawtooth current and hence, since both the forward stroke time and the fly-back time remain constant, the amplitude of the sawtooth current.

(b) Variation of the mean current of the line output tube because the quantity of electro-magnetic enregy accumulated during the forward stroke time in the inductance of said circuit is varied, and hence indirectly the voltage of the booster capacitor is determined.

For varying the quality Q of the circuit, two methods are possible:

(c) Negative damping; the negative damping and hence the quality Q must increase when the amplitude of the deflection current increases, and conversely.

(d) Damping: in this case damping must decrease and hence the quality Q must increase when the amplitude increases, and conversely.

Figure 2:
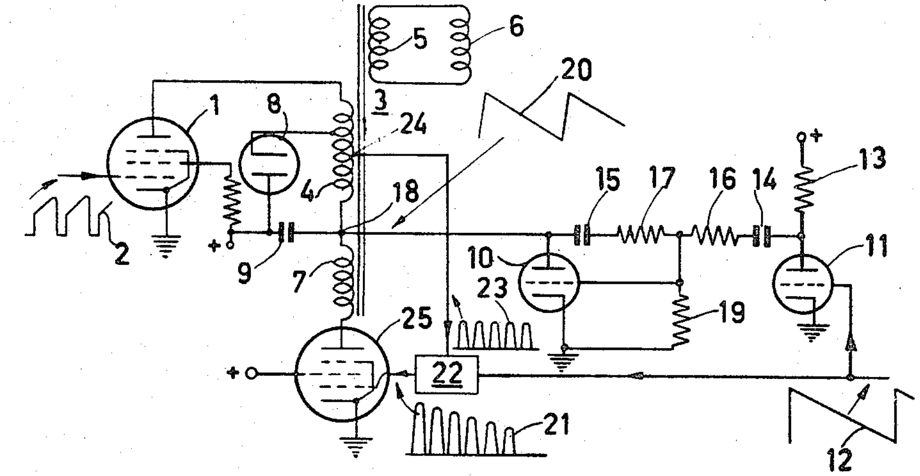
FIG. 2 shows a first embodiment in which the voltage $V_c$ of the booster capacitor included in the efficiency-diode circuit is varied and the aforesaid circuit is separately negatively damped, both in the rhythm of the frequency of the vertical deflection signal.
Figure 3:
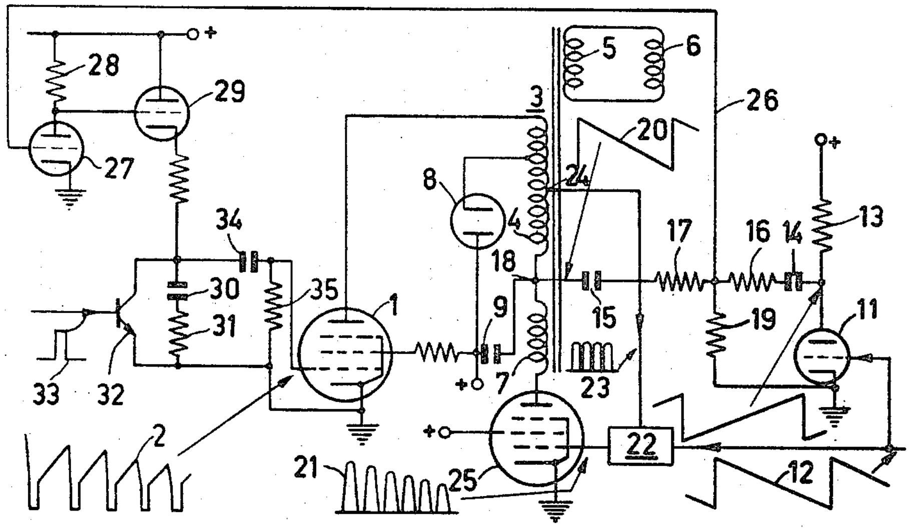
FIG. 3 shows a second embodiment in which the current through the horizontal output tube is modulated and the circuit is negatively damped separately, both in the rhythm of the frequency of the vertical deflection signal.
Figure 4:
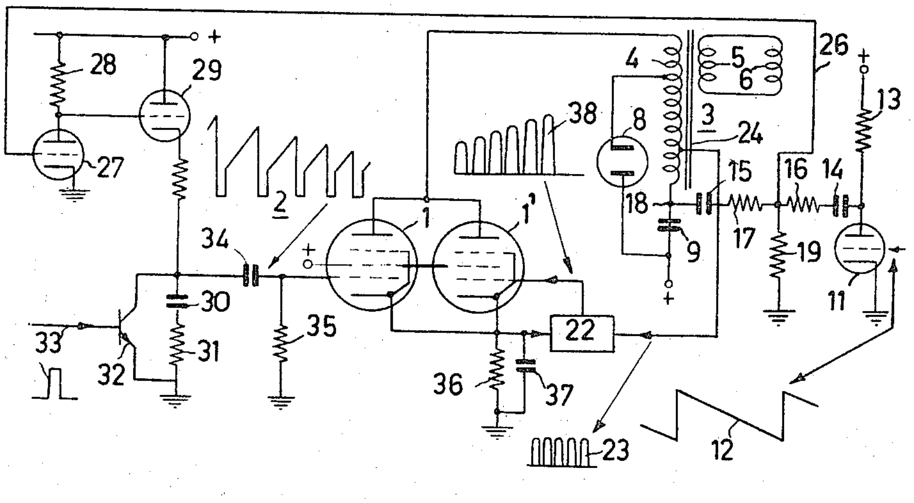
FIG. 4 shows a third embodiment in which the current through the horizontal output tube is modulated and the circuit is damped separately, both in the rhythm of the frequency of the vertical deflection signal.
Figure 5:
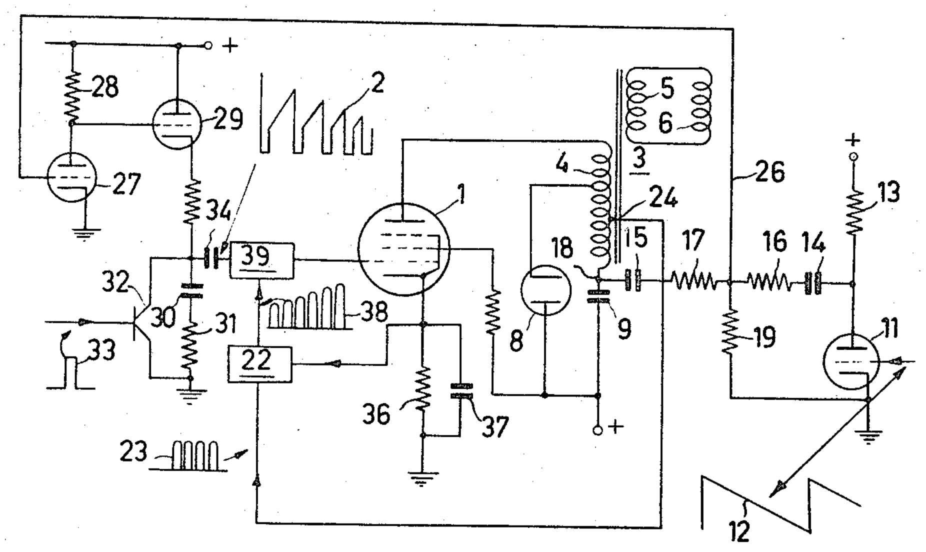
FIG. 5 shows a simplification of the embodiment of FIG. 4.

In FIG. 2 the methods (a) and (c) are combined, in FIG. 3 the methods (b) and (c) and in FIGS. 4 and 5 the methods (b) and (d). It will be obvious that the methods (a) and (d) can be combined in a similar manner.

Referring to FIG. 2, reference numeral 1 designates the horizontal or line output tube, to the first control-grid of which is fed the more or less sawtooth-like control-signal 2. The output circuit of said tube includes the horizontal output transformer 3, having a winding 4 to which there are magnetically coupled a first secondary winding 5, with which the deflection coils 6 are connected, and a second secondary winding 7, which serves, as will be explained hereinafter, for negative damping during the fly-back. The output circuit includes furthermore the booster diode 8 and the booster capacitor 9, which elements provide in known manner that energy accumulated in said circuit during the forward stroke can be restored.

In order to modulate the amplitude of the horizontal deflection current in the rhythm of the frequency of the vertical deflection signal, the arrangement shown in FIG. 2 includes furthermore triode tubes 10 and 11. To the control-grid of the triode 11 is fed a control-signal 12 obtained from the vertical deflection circuit. The anode of the triode 11 is connected via an ohmic load resistor 13 to a supply voltage source and via the series combination of the capacitors 14 and 15 and the resistors 16 and 17 to the anode of the other triode 10, which in turn is connected to the junction 18 to which the booster capacitor 9 is connected. The junction of the resistors 16 and 17 is furthermore connected to the control-grid of the triode 10 and via the resistor 19 to ground. The circuit including the elements 10 to 19 operates as a balance circuit and serves for varying the voltage across the booster capacitor, or in other words the voltage at the junction 18, in the rhythm of the frequency of the signal 12. In this circuit, when the voltage at the anode of the triode 11 is high, the voltage at the anode of the triode 10 will be low, and conversely. When the control-signal 12 has a high value, the voltage at the anode of the triode 11 will be low and correspondingly the voltage at the anode of the triode 10 will be high, so that the sawtooth current through the deflection coil 6 has a greater slope than in the event of a low value of the signal 12. Since, as can be inferred from the signal 12, the amplitude drops gradually from a high value to a low value (the signal 12 has a sawtooth waveform), the voltage at the point 18 will have the same waveform as the control-signal 12, which is indicated by the waveform labelled 20. If the voltage at junction 18 drops gradually, the slope of the deflection current passing through the deflection coil 6 will also decrease gradually and hence also the amplitude of said deflection current. As stated in the preamble, a high amplitude of the deflection current is associated with a high quality of the circuit formed by the output transformer 3, the deflection coil 6 and the capacitances of the output circuit of the tube 1, both real and stray. A high quality of this circuit means a high negative damping. Therefore, the current passing through the additional coil 7 during the fly-back time must have a high amplitude, which must also decrease with a decreasing amplitude of the deflection current, which is indicated by the signal at 21. This is achieved by feeding the signal 12 also to a modulator stage 22, to which fly-back pulses 23 are supplied, which are obtained from a tapping 24 of the winding 4. After modulation in the modulation stage 22, the signal 21 is produced at the output thereof. This signal is supplied to the pentode 25 which is connected in series with the additional coil 7. It is ensured in this manner that the required negative damping is imparted to the circuit in the same rhythm in which the amplitude of the deflection current is varied. It is thus possible to eliminate the undesirable shift component from the deflection current so that a symmetrical signal is obtained.

It will be obvious that instead of using the balance circuit of the elements 10 to 19, use may be made of any other amplifying circuit which provides a variation of the voltage at point 18 as illustrated by the curve 20. If the signal 12 had sufficient strength, even a direct control of point 18 would be possible with the aid of the signal 12.

In the embodiment shown in FIG. 3, in which corresponding parts are designated as far as possible by the same reference numerals as those of FIG. 2, the methods (b) and (c) are combined. As far as method (c) is concerned, the arrangement of FIG. 3 is similar to that of FIG. 2, but as stated above, the amplitude-modulation of the deflection current is performed in a different way. To this end the junction of the resistors 16 and 17 is connected via the conductor 26 to the control-grid of the triode 27. The anode of triode 27 is connected via a load resistor 28 to the supply voltage source and, moreover, to the control-grid of a second triode 29, which controls the charging current for the capacitor 30. In series with the load capacitor 30 there is connected a peak-voltage resistor 31 in order to obtain pulses, which must provide the cut-off of the line output tube 1 during the fly-back. The elements 30 and 31 are shunted by a discharge transistor 32, which is controlled by line synchronizing pulses 33 so as to discharge the capacitor 30 during the fly-back time. The control-signal 2 produced across the elements 30 and 31 is supplied through a capacitor 34 and a leakage resistor 35 to the control-grid of the line output tube 1.

The circuit arrangement operates as follows. If the control-signal 12 has a high value, the voltage at the anode of the tube 11 will have a low value. Consequently, the junction of the resistors 16 and 17 will have a low-voltage and the tube 27 will draw a low current. As a result, the voltage at its anode is high and the tube 29 has a high current, so that the capacitor 30 is charged to a high value. Thus a signal having a high amplitude is produced across the capacitor 30. If, on the contrary, the voltage at the anode of the tube 11 is high, the voltage at the junction of the resistors 16 and 17 is high, so that the tube 27 will draw a high current. As a result, the voltage at its anode is low and the tube 29 draws a low current so that the capacitor 30 is charged to a considerably lower value. Since the amplitude of the signal 12 gradually decreases, also the amplitude-modulation of the signal 2 will gradually decrease during the forward stroke of the vertical deflection, which is illustrated by waveform 2 in FIG. 3.

Consequently, the signal 2 controls the tube 1 so that a deflection current flows through the deflection coil 6, the amplitude of which current decreases during the forward stroke of the vertical deflection signal, so that at the junction 18 the booster voltage will exhibit a variation illustrated by the curve 20 which is similar to that of the arrangement shown in FIG. 2. This is associated with a negative damping signal 21, which is described with reference to the arrangement of FIG. 2. An advantage of the arrangement of FIG. 3 consists in that the tube 1 itself takes part in the control-circuit, since the control of the amplitude-modulation is performed via the tube 1 and is, so to say, compared with the voltage at the anode of the tube 11. The junction of the resistors 16 and 17 is governed by the voltage at point 18 and that of the anode of the tube 11, so that the control of the triodes 27 and 29, and hence the charging of the capacitor 30, depend upon the difference between the voltages at point 18 and the anode of the tube 11. Moreover, it is ensured in this way that the characteristic curves of the horizontal deflection circut itself take part in the control, which particularly applies to the anode current-grid voltage characteristic curves of the tube 1, which curves may exhibit a certain degree of non-linearity. In other words, the arrangement shown in FIG. 3 is a reverse control for the amplitude-modulation of the deflection current, whereas the negative damping mechanism is a forward control. In the arrangement shown in FIG. 2, however, both the amplitude-modulation of the deflection current and the negative damping mechanism are reverse controls.

In the arrangement shown in FIG. 4 and in that shown in FIG. 5 the tendency is to provide a reverse control both for the amplitude-modulation and the variation of the quality Q. The amplitude-modulation of the horizontal deflection current is performed as indicated for the arrangement of FIG. 3, so that a control-signal 2 is fed to the control-grid of the tube 1, the amplitude of which signal varies in the rhythm of the frequency of the vertical deflection signal.

From FIG. 4 it is apparent that the line output tube is split up into two output tubes 1 and 1′, which are connected to ground via a common cathode resistor 36. The cathode resistor 36 is shunted by a capacitor 37 having a value of capacitance such that no voltage can be produced across the parallel combination 36, 37 at the line frequency, but a voltage having the frequency of the vertical deflection signal can be produced. The operation of the arrangement of FIG. 4 is based, as stated above, on the principle of varying the damping during the fly-back time. This varying damping is provided by the tube 1′. It is stated above that with a high amplitude of the deflection current the quality of said circuit must be high, which means that the damping must be low. This means that at the beginning of a vertical deflection, when the amplitude of the deflection current is high, the tube 1′ must draw only low current during the fly-back, in order to have low damping of the circuit. Accordingly as the amplitude of the control-signal 2 decreases, the current through the tube 1′ must increase during the fly-back. This means that with an increasing current through the tube 1, the current through the tube 1′ must decrease, and conversely. If the current through the tube 1 is designated by $i_{a1}$ and that through the tube 1′ by $i_{a1}'$, it must apply that:

$$i_{a1}+i_{a1}'=\text{constant}$$

It follows therefrom that with such a control no additional D.C. component will flow through the output circuit of the tubes 1 and 1′, which is the purpose aimed at, because if the mean current through these tubes were constant during the whole vertical scan, no shift component can prevail in the deflection current.

This control-method can be realized as follows. The voltage produced across the parallel combination 36 and 37 is fed to the modulator 22, to which are also fed the fly-back pulses 23 obtained from the tapping 24. As stated above, the control must be performed, if the mean current through the tubes 1 and 1′ is constant, so that with a decrease in mean current through tube 1 due to the signal 2 the mean current through the tube 1′ must increase, and conversely. Therefore if the control-circuit formed by the parallel combination of the resistor 36, the capacitor 37 and the modulator 22 provides that the control-signal 38 applied to the control-grid of the tube 1′ increases with a decreasing amplitude of the signal 2, the sum of the anode currents of the tubes 1 and 1′ will just be constant. This means that the control-circuit provides automatically that the anode currents in common remain constant and since by the control of the signal 2 the anode current of the tube 1 decreases, the control at the control-grid of the tube 1′ must compulsorily follow so that the control-circuit maintains a constant sum of the anode currents. This means that by this double reverse control it is ensured that no D.C. component can be found in the deflection signal passing through the deflection coil 6, so that the arrangement of FIG. 4 yields the best results.

The arrangement shown in FIG. 5 is merely a simplification of that shown in FIG. 4, which is based on the knowledge that the tube 1 of FIG. 4 is cut off during the fly-back, whereas the tube 1' draws current only during the fly-back. It will therefore be obvious that, when the control-signals 2 and 38 are added to each other, one tube 1 may suffice, which is then controlled by the signal 2 during the forward stroke and by the signal 38 during the fly-back. The sole item by which the arrangement shown in FIG. 5 is distinguished from that of FIG. 4 consists in that the tubes 1 and 1' are united to form a single tube 1 and that furthermore an adding circuit 39 is included in the arrangement of FIG. 5 for adding together the signals 38 and 2 before their application to the control-grid of the tube 1. All advantages of the arrangement of FIG. 4 are therefore maintained in that of FIG. 5 but the arrangement of FIG. 5 is simpler, since the expensive additional output tube 1' is replaced by a simple adder 39, which can be formed either by a much cheaper tube or, in the case of sufficient strength of the signals 2 and 38, by a simple resistor network. It should be noted that, although in the arrangements shown in FIGS. 3, 4 and 5 a booster capacitor 9 is included, this booster capacitor is not strictly required in the control-method in which the tube 1 provides the amplitude-modulation. This control-method can be carried out without the booster capacitor 9 since the amplitude variation is obtained by variation of the current through the tube 1. The control-method of the arrangements shown in FIGS. 3, 4 and 5 has the advantage that, moreover, a comparison between the booster voltage and the control-voltage can be performed in a simple manner, which would not be possible in the case of a fixed supply-voltage 18.

Moreover, with this method the amplitude-modulation is obtained by means of a reverse control-circuit, which involves participation of the characteristic curves of the tube 1.

Although in the present examples a transistor is only used for the discharge of the capacitor 30, it will be obvious that all other amplifying elements can be replaced by transistors.

What is claimed is:

1. A circuit for producing a sawtooth deflection current in the horizontal deflection coil of a television system comprising, amplifying means comprising first and second electrodes which define a current path therein and a control electrode for controlling the flow of current in said path, an output circuit coupled to said first electrode comprising an output transformer and means for coupling said horizontal deflection coil thereto, means for applying a cyclically varying control voltage of the horizontal deflection frequency to said control electrode thereby to control the conduction of said amplifying means to produce said sawtooth deflection current in said transformer and said horizontal deflection coil, means including said amplifying means for amplitude modulating said horizontal deflection current at the vertical deflection frequency, said output circuit having a quality Q determined by said output transformer, said deflection coil and the capacitances of said output circuit, and means for varying the Q of said output circuit at a frequency equal to said vertical deflection freqency and in the same sense as the amplitude modulation of the horizontal deflection current thereby to compensate for any DC current component of said vertical deflection frequency produced in said horizontal deflection current.

2. A circuit as described in claim 1 wherein said output circuit further comprises a boost capacitor, and wherein said deflection current modulating means comprises means for producing a voltage variation of said vertical deflection frequency and means for applying said voltage variation to said boost capacitor thereby to vary the voltage thereon at said vertical deflection frequency.

3. A circuit as described in claim 1 wherein the means for varying the Q of said output circuit comprises, modulating means having first and second inputs and an output, means for coupling said output transformer to said first input so as to supply to said first input horizontal flyback pulses produced in said transformer, means for applying a sawtooth voltage variation of said vertical deflection frequency to said second input thereby to produce at said modulating means output flyback pulses amplitude modulated at said vertical deflection frequency, an inductor magnetically coupled to said output transformer, amplifier means connected in series with said inductor and having a control electrode coupled to the output of said modulating means so as to control the current flow in said inductor during the flyback period in a sense to produce a negative damping effect on said output circuit.

4. A circuit as described in claim 1 further comprising a boost capacitor connected in said output circuit, said deflection current modulating means comprising means for producing a sawtooth voltage variation of said vertical deflection frequency and means for applying said voltage variation to said boost capacitor thereby to vary the voltage thereon at said vertical deflection frequency, and wherein the means for varying the Q of said output circuit comprises, modulating means having first and second inputs and an output, means for coupling said output transformer to said first input so as to supply to said first input horizontal flyback pulses produced in said transformer, means for applying a sawtooth voltage variation of said vertical deflection frequency to said second input thereby to produce at the output of said modulating means flyback pulses amplitude modulated at said vertical deflection frequency, an inductor magnetically coupled to said output transformer, amplifier means connected in series with said inductor and having a control electrode coupled to the output of said modulating means, said amplifier means being responsive to said amplitude modulated flyback pulses so as to control the current flow in said inductor during the flyback period in a sense to produce a negative damping effect on said output circuit.

5. A circuit for producing a sawtooth deflection current in the horizontal deflection coil of a television system comprising, amplifying means including first and second electrodes which define a current path therein and a control electrode for controlling the flow of current in said path, an output circuit coupled to said first electrode comprising an output transformer and means for coupling said horizontal deflection coil thereto, means for generating substantially sawtooth voltage variations of the horizontal deflection frequency which are amplitude modulated at the vertical deflection frequency, means for applying said amplitude modulated voltage variations to said control electrode thereby to control the conduction of said amplifying means to produce an amplitude modulated sawtooth deflection current in said output circuit, said output circuit having a quality Q determined by said output transformer, said deflection coil and the capacitances of said output circuit, and means for varying the Q of said output circuit at a frequency equal to said vertical deflection frequency and in the same sense as the amplitude modulation of the horizontal deflection current, whereby the Q of said output circuit increases as the amplitude of the deflection current increases, and vice-versa.

6. A circuit as described in claim 5 wherein said sawtooth voltage generating means comprises a first modulator circuit having first and second inputs and an output connected to the control electrode of said amplifying means, means for applying a substantially sawtooth voltage variation of the vertical deflection frequency to said first input, means for applying a cyclically varying voltage of the horizontal deflection frequency to said second input, said means for varying the Q of said output circuit comprising a second modulator circuit having first and second inputs and an output, means for coupling said output transformer to said first input so as to supply to said first input horizontal flyback pulses produced in said transformer, means for applying a sawtooth voltage variation of said vertical deflection frequency to said second input thereby to produce at said second modulator circuit output flyback pulses amplitude modulated at said vertical deflection frequency, an inductor magnetically coupled to said output transformer, amplifier means connected in series with said inductor and having a control electrode coupled to the output of said second modulator circuit so as to control the current flow in said inductor during the flyback period in a sense to produce a negative damping effect on said output circuit.

7. A circuit as described in claim 5 wherein said sawtooth voltage generating means comprises a capacitor, a second amplifier connected in series with said capacitor and a source of direct voltage and having a control electrode for controlling the rate of charge of said capacitor, means for applying a substantially sawtooth voltage variation of the vertical deflection frequency to said second amplifier control electrode, means for cyclically discharging said capacitor at the horizontal deflection frequency thereby to produce said amplitude modulated voltage variations across the capacitor, and means for coupling said capacitor to the control electrode of said amplifying means.

8. A circuit as described in claim 7 wherein said means for varying the Q of said output circuit comprises a third amplifier having a control electrode, an inductor, means connecting said third amplifier and said inductor in series circuit with a winding of said output transformer, means for producing horizontal flyback pulses amplitude modulated at the vertical deflection frequency and in the same sense as said amplitude modulated voltage variations, and means for applying said amplitude modulated flyback pulses to the control electrode of said third amplifier so as to control the current flow in said inductor during the flyback period thereby to vary the damping effect on said output circuit.

9. A circuit as described in claim 5 wherein said means for varying the Q of said output circuit comprises, a second amplifier connected in parallel with said amplifying means and having a control electrode, impedance means connected in series with the parallel combination of said amplifying means and said second amplifier and arranged to have an impedance that is relatively low for currents of the horizontal deflection frequency and an impedance that is relatively high for currents of the vertical deflection frequency, a modulator circuit having first and second inputs and an output coupled to the control electrode of said second amplifier, means for coupling the horizontal flyback pulses produced in said output transformer to said first input, and means for coupling the voltage developed across said impedance means to said second input thereby to produce at the output of said modulator circuit amplitude modulated flyback pulses which vary in a sense that tends to maintain the sum of the currents in said amplifying means and said second amplifier constant.

10. A circuit as described in claim 9 wherein said sawtooth voltage generating means comprises, a capacitor, a third amplifier connected in series with said capacitor and a source of direct voltage and having a control electrode for controlling the rate of charge of said capacitor, means for applying a substantially sawtooth voltage variation of the vertical deflection frequency to said third amplifier control electrode, means for cyclically discharging said capacitor at the horizontal deflection frequency thereby to produce said amplitude modulated voltage variations across the capacitor, and means for coupling said capacitor to the control electrode of said amplifying means.

11. A circuit as described in claim 5 wherein said means for varying the Q of said output circuit comprises, impedance means connected in series with said amplifying means and arranged to have an impedance that is relatively low for currents of the horizontal deflection frequency and an impedance that is relatively high for currents of the vertical deflection frequency, a modulator circuit having first and second inputs and an output coupled to the control electrode of said amplifying means, means for coupling the horizontal flyback pulses produced in said output transformer to said first input, and means for coupling the voltage developed across said impedance means to said second input thereby to produce at the output of said modulator circuit amplitude modulated flyback pulses which vary in a sense that is opposite to that of said amplitude modulated voltage variations.

12. A circuit for producing a sawtooth deflection current in the horizontal deflection coil of a television system comprising, amplifying means comprising first and second electrodes which define a current path therein and a control electrode for controlling the flow of current in said path, an output circuit coupled to said first electrode comprising an output transformer and means for coupling said horizontal deflection coil thereto, said output circuit having a quality Q determined by said output transformer, said deflection coil and the capacitances of said output circuit, means for generating substantially sawtooth voltage variations of the horizontal deflection frequency which are amplitude modulated at the vertical deflection frequency, an adding circuit having first and second inputs and an output coupled to the control electrode of said amplifying means, means for applying said amplitude modulated voltage variations to said first adding circuit input thereby to control the conduction of said amplifying means to produce an amplitude modulated sawtooth deflection current in said output circuit, means for generating horizontal flyback pulses which vary in amplitude at a rate corresponding to the vertical deflection frequency and in a sense inverse to that of said amplitude modulated sawtooth voltage variations, and means for applying said amplitude modulated flyback pulses to said second adding circuit input thereby to control the conduction of said amplifying means during the flyback period so as to vary the Q of said output circuit at a frequency corresponding to said vertical deflection frequency.

13. A circuit as described in claim 12 wherein said means for generating and applying the amplitude modulated flyback pulses comprises a modulator circuit having first and second inputs and an output coupled to the second input of said adding circuit, means for coupling the horizontal flyback pulses produced in said output transformer to said first input of the modulator circuit, and means for applying to said second input of the modulator circuit a voltage that varies inversely to said amplitude modulated sawtooth voltage variations and at said vertical deflection frequency.

References Cited

UNITED STATES PATENTS 2,370,426 2/1945 Schade ------------- 178—7.2

OTHER REFERENCES

RCA Technical Note No. 548, March 1962, pp. 1, 2.

JOHN W. CALDWELL, *Acting Primary Examiner.*

DAVID G. REDINBAUGH, *Examiner.*

T. A. GALLAGHER, R. L. RICHARDSON, *Assistant Examiners.*